United States Patent
Kaiser

(10) Patent No.: US 10,900,694 B2
(45) Date of Patent: Jan. 26, 2021

(54) RECOVERABLE AND RENEWABLE HEAT RECOVERY SYSTEM AND RELATED METHODS

(71) Applicant: Commercial Energy Saving Plus, LLC, Stroudsburg, PA (US)

(72) Inventor: Stewart Kaiser, Stroudsburg, PA (US)

(73) Assignee: COMMERCIAL ENERGY SAVING PLUS, LLC, Boca Raton, FL (US)

( * ) Notice: Subject to any disclaimer, the term of this patent is extended or adjusted under 35 U.S.C. 154(b) by 145 days.

(21) Appl. No.: 16/179,241

(22) Filed: Nov. 2, 2018

(65) Prior Publication Data
US 2020/0124322 A1 Apr. 23, 2020

Related U.S. Application Data

(60) Provisional application No. 62/747,186, filed on Oct. 18, 2018.

(51) Int. Cl.
| | |
|---|---|
| *F24J 2/38* | (2014.01) |
| *F24S 20/30* | (2018.01) |
| *F24S 10/70* | (2018.01) |
| *F24S 70/20* | (2018.01) |
| *F24S 80/30* | (2018.01) |
| *F24S 20/20* | (2018.01) |
| *F24S 80/00* | (2018.01) |

(52) U.S. Cl.
CPC .............. *F24S 20/30* (2018.05); *F24S 10/70* (2018.05); *F24S 20/20* (2018.05); *F24S 70/20* (2018.05); *F24S 80/30* (2018.05); *F24S 2080/03* (2018.05)

(58) Field of Classification Search
CPC ....................................................... F24S 20/30
USPC ........................................ 126/714, 585, 569
See application file for complete search history.

(56) References Cited

U.S. PATENT DOCUMENTS

| | | | | |
|---|---|---|---|---|
| 4,007,776 A | * | 2/1977 | Alkasab | F24F 5/0046 165/236 |
| 4,106,952 A | | 8/1978 | Kravits | |
| 4,111,259 A | * | 9/1978 | Lebduska | F24D 11/0221 237/1 R |
| 4,248,049 A | * | 2/1981 | Briley | F24D 11/0221 62/235.1 |
| 4,302,942 A | * | 12/1981 | Charters | F24D 11/0221 62/235.1 |
| 4,336,692 A | | 6/1982 | Ecker | |
| 4,507,936 A | | 4/1985 | Yoshino | |

(Continued)

OTHER PUBLICATIONS

PCT International Searching Authority; International Search Report and Written Opinion dated Feb. 1, 2019; entire document.

*Primary Examiner* — Avinash A Savani
(74) *Attorney, Agent, or Firm* — Allen Dyer Doppelt & Gilchrist, PA

(57) ABSTRACT

A recoverable and renewable heat recovery system includes a variable speed inverter compressor in fluid connection with a first heat exchanger and a second heat exchanger via a fluid circuit. The system further includes a solar thermal collection module positioned on top of the compressor and in fluid communication with the compressor, the first heat exchanger and the second heat exchanger via the fluid circuit. A light intensity sensor is configured to determine light intensity on the solar thermal collection module. The solar thermal collection module is configured to retain solar energy thermal energy to increase fluid pressure in the compressor.

21 Claims, 11 Drawing Sheets

(56) References Cited

U.S. PATENT DOCUMENTS

| | | | |
|---|---|---|---|
| 5,826,435 A | 10/1998 | Hange | |
| 6,253,563 B1* | 7/2001 | Ewert | F25B 27/005 |
| | | | 62/235.1 |
| 9,528,717 B2 | 12/2016 | Childs et al. | |
| 9,698,726 B2 | 7/2017 | Banerjee | |
| 2008/0121225 A1 | 5/2008 | Kuckelkorn | |
| 2009/0165843 A1 | 7/2009 | Horioka et al. | |
| 2010/0024804 A1* | 2/2010 | Chiu | F24D 11/003 |
| | | | 126/640 |
| 2010/0065044 A1* | 3/2010 | Reader | H02S 20/23 |
| | | | 126/676 |
| 2011/0219801 A1* | 9/2011 | McKenzie | F25B 27/005 |
| | | | 62/235.1 |
| 2012/0017622 A1* | 1/2012 | Kondo | F24S 50/80 |
| | | | 62/235.1 |
| 2012/0131941 A1* | 5/2012 | Ackner | F24S 25/33 |
| | | | 62/235.1 |
| 2015/0267946 A1* | 9/2015 | Lowstuter, Jr. | F25B 49/02 |
| | | | 62/235.1 |
| 2015/0349704 A1 | 12/2015 | Kim | |

* cited by examiner

RECOVERABLE AND RENEWABLE HEAT RECOVERY SYSTEM AND RELATED METHODS

CROSS-REFERENCE TO RELATED APPLICATION

This application claims the benefit of U.S. Provisional Patent Application Ser. No. 62/747,186, filed on Oct. 18, 2018, the contents of which are herein incorporated by reference in their entirety.

FIELD OF THE INVENTION

This invention relates generally to the field of air conditioning and heating systems; more particularly, a recovery and renewable heat exchange system using solar thermal energy.

BACKGROUND OF THE INVENTION

In a heat recovery system, a heat pump typically pulls heat out of the outdoor environment and transfers that thermal energy into a building, home or structure in a heating cycle. The efficiency of the heating cycle is too low to justify use when the outdoor temperature is below about 32° F. In this case, an auxiliary heating is needed to keep the building warm. This is typically achieved with electrical resistance coils, which are very inefficient in terms of energy conversion and expensive to operate.

A heat pump cannot take the place of a conventional gas-fired furnace if the temperature remains below freezing for long. In locations where this is common, gas-fired furnaces are used in a combustion cycle to produce large amounts of thermal energy. Such furnaces also exhaust greenhouse gases into the environment. Highly efficient condensing furnaces produce large amounts of acidic residue, which is pumped into drains and the soil.

Solar energy obtained from photovoltaic solar panels has been used to reduce electrical consumption in a heat recovery system. In the winter, however, ice and snow can cover solar panels, disabling them or making them much less efficient. Solar panels generally require a large surface area to accomplish certain goals. It can be difficult to have a large surface area of solar panels in an urban environment or wherever there is a high density of buildings. In addition, conventional solar panels are expensive and require many years of operation for the cost of materials and installation to be outweighed by savings on utility bills. Many conventional solar panels require direct sunlight for maximum performance, which is typically limited to a few hours each day of total sunshine, and on cloudy or partly sunny days, performance is drastically reduced. The deficiencies and limitations suggest that further improvements can be realized for a heat recovery system.

SUMMARY OF THE INVENTION

In view of the foregoing, it is an object of the present invention to provide a recoverable and renewable heat recovery system and related methods. According to one embodiment of the invention, a recoverable and renewable heat recovery system includes a variable speed inverter compressor in fluid connection with a first heat exchanger and a second heat exchanger via a fluid circuit. The system further includes a solar thermal collection module positioned on top of the compressor and in fluid communication with the compressor, the first heat exchanger and the second heat exchanger via the fluid circuit. A light intensity sensor is configured to determine light intensity on the solar thermal collection module. The solar thermal collection module is configured to retain solar energy thermal energy to increase fluid pressure in the compressor. Compressor operation is based on measurement of the light intensity sensor.

According to another embodiment of the invention, a method of recovering heat energy includes obtaining solar thermal energy via a solar thermal collection module and pressurizing fluid contained in a compressor by at least partially utilizing solar thermal energy from the thermal collection module. Heat energy exchange is effectuated via a first heat exchanger and a second heat exchanger in fluid communication with the compressor, and heat energy is exchanged by forcing air over the first and second heat exchanger.

According to another embodiment of the present invention, a solar thermal module includes a plurality of solar thermal cell chambers positioned in parallel and covered by tempered glass and a plurality of interconnected fluid pipes positioned through each solar thermal chamber. A layer of reflective materials covers the inner sidewall of each solar thermal cell chamber. Each cell chamber is filled with a foam material to retain solar thermal energy. One or more drain holes are located on a bottom surface of each cell chamber for draining condensing liquid and avoiding moisture buildup.

These and other objects, aspects and advantages of the present invention will be better appreciated in view of the drawings and following detailed description of preferred embodiments.

DETAILED DESCRIPTION OF A PREFERRED EMBODIMENT

Figure 1:
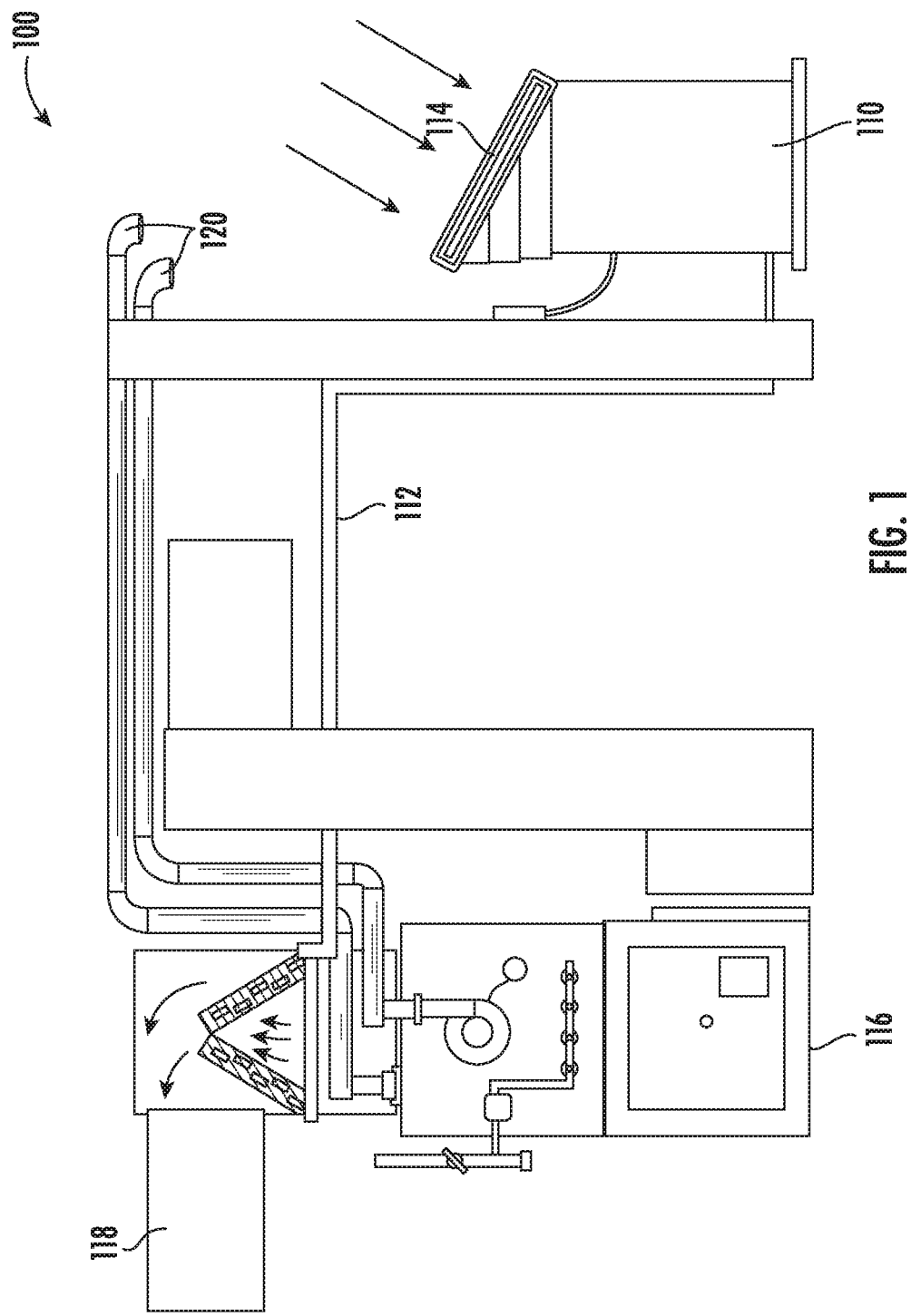
FIG. 1 illustrates an example heat recovery system in a cooling cycle utilizing solar thermal energy, according to an embodiment of the present invention.
Figure 2:
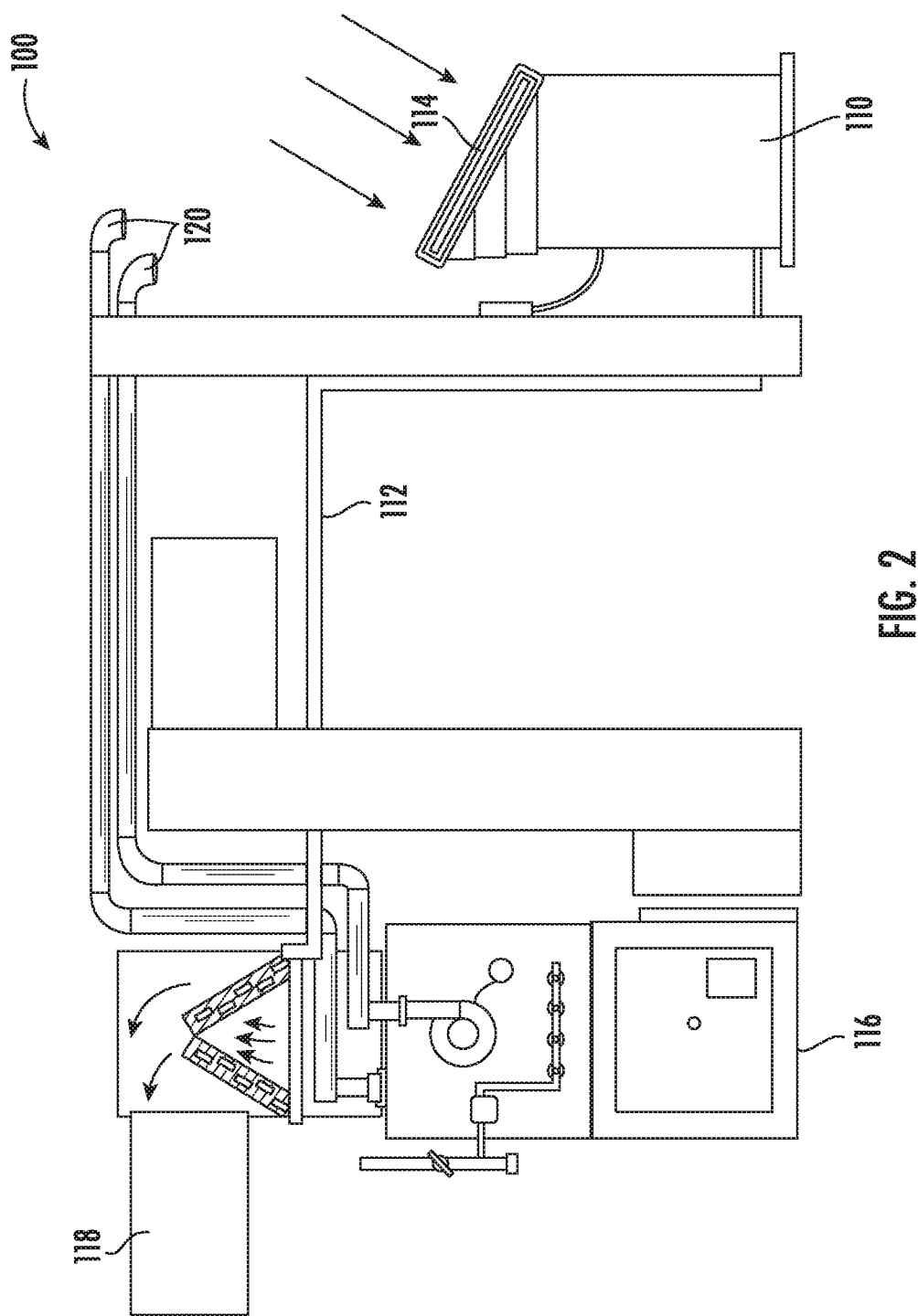
FIG. 2 illustrates an example heat recovery system in a heating cycle utilizing solar thermal energy, according to another embodiment of the present invention.

According to an embodiment of the present invention, and referring to FIGS. 1-2, the system 100 includes a heat pump 110 having a variable speed inverter compressor (not shown) in fluid connection with a first heat exchanger and a second heat exchanger (not shown) via a fluid circuit 112. The compressor is configured to assist fluid (e.g., refrigerant) flow within the fluid circuit 112. In the depicted embodiment, the heat pump 110 is placed outdoors and integrated with a solar thermal collection module 114 positioned thereon. A furnace 116 is used in addition to the heat pump 110 in under high heating demand. The furnace 116 can be an oil-burning furnace or other type of furnace, e.g. one that burns natural gas. Air is supplied to the inside of a building via a supply duct 118. The exhaust gas from the burning furnace 116 is released to the external environment via the exhaust gas outlet 120.

The solar thermal module 114 is configured to utilize solar thermal energy in the environment to increase fluid pressure inside the compressor of the heat pump 110. Solar thermal energy can dramatically increase the fluid temperature within the compressor, and the temperature can exceed 500° F. under certain conditions. Capture of solar thermal energy can be used to achieve considerable fluid (e.g., refrigerant) pressurization with little mechanical work, limiting the electrical energy required. A high-powered compressor may not be necessary in most embodiments of the system 100 for sufficient fluid flow. The compressor of the heat pump 110 can operate only as needed and at a speed as needed. In the cooling mode, the solar thermal energy collected by the solar thermal collection module 114 can save up to 60% of the electrical energy that would be used in summer time. In essence the system allows the heat absorbed via the solar thermal module 114 to increase the pressure of the refrigerant instead of requiring the compressor of the heat pump 110 to achieve a same amounting of compressing utilizing mechanical performance. This allows the system 100 to maintain the same performance of heat transfer using much less electrical energy.

In a preferred embodiment, the solar thermal collection module 114 is placed on top of the heat pump 110 for minimum fluid transportation length and maximum exposure to sun light. The solar thermal collection module 114 is preferably installed facing south in the northern hemisphere for maximum sunlight absorption. The solar thermal collection module 114 and the heat pump 110 can be made as an integral piece.

Figure 3:
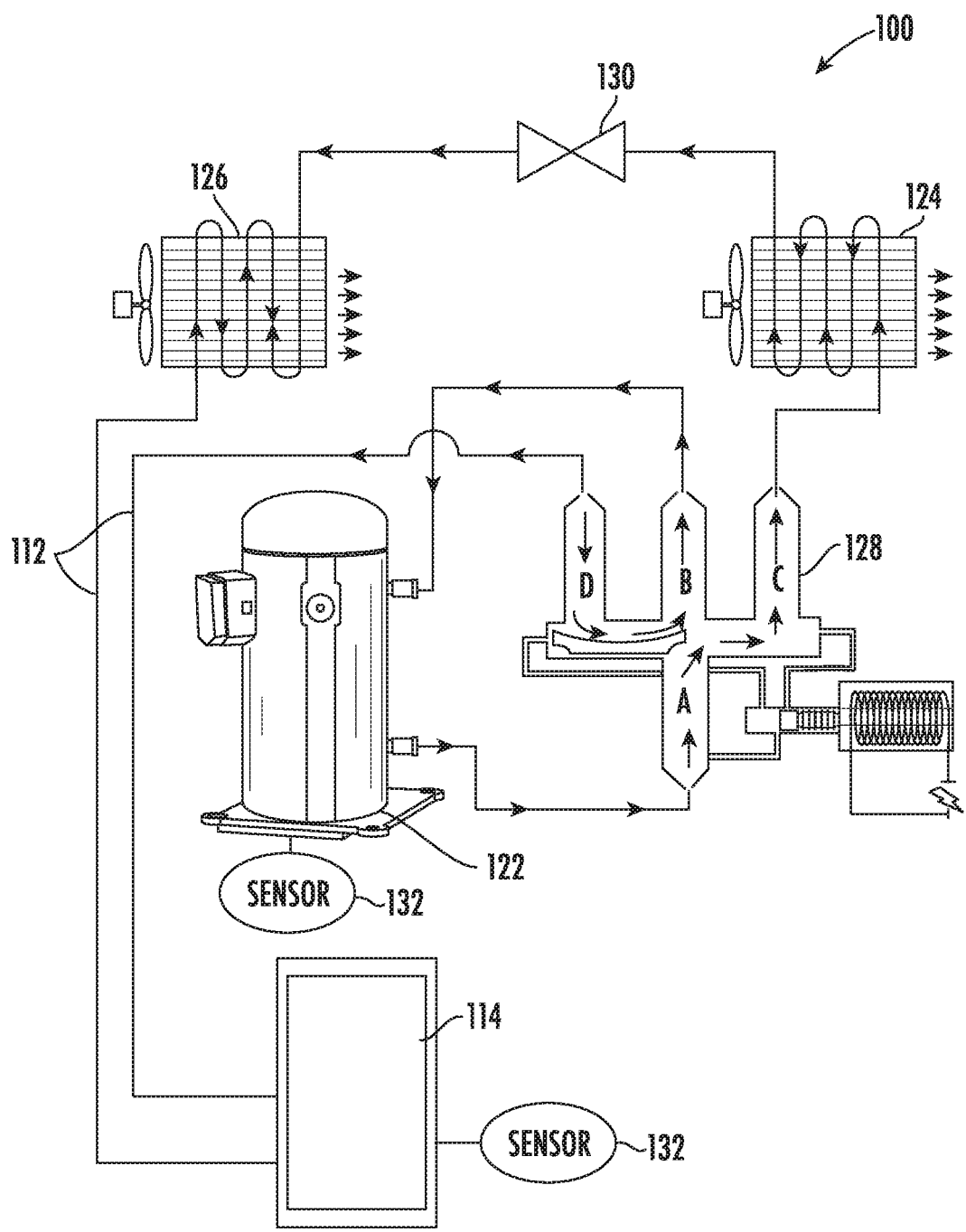
FIG. 3 illustrates a detailed view of an example heat recovery system in a heating cycle, according to an embodiment of the present invention.
Figure 4:
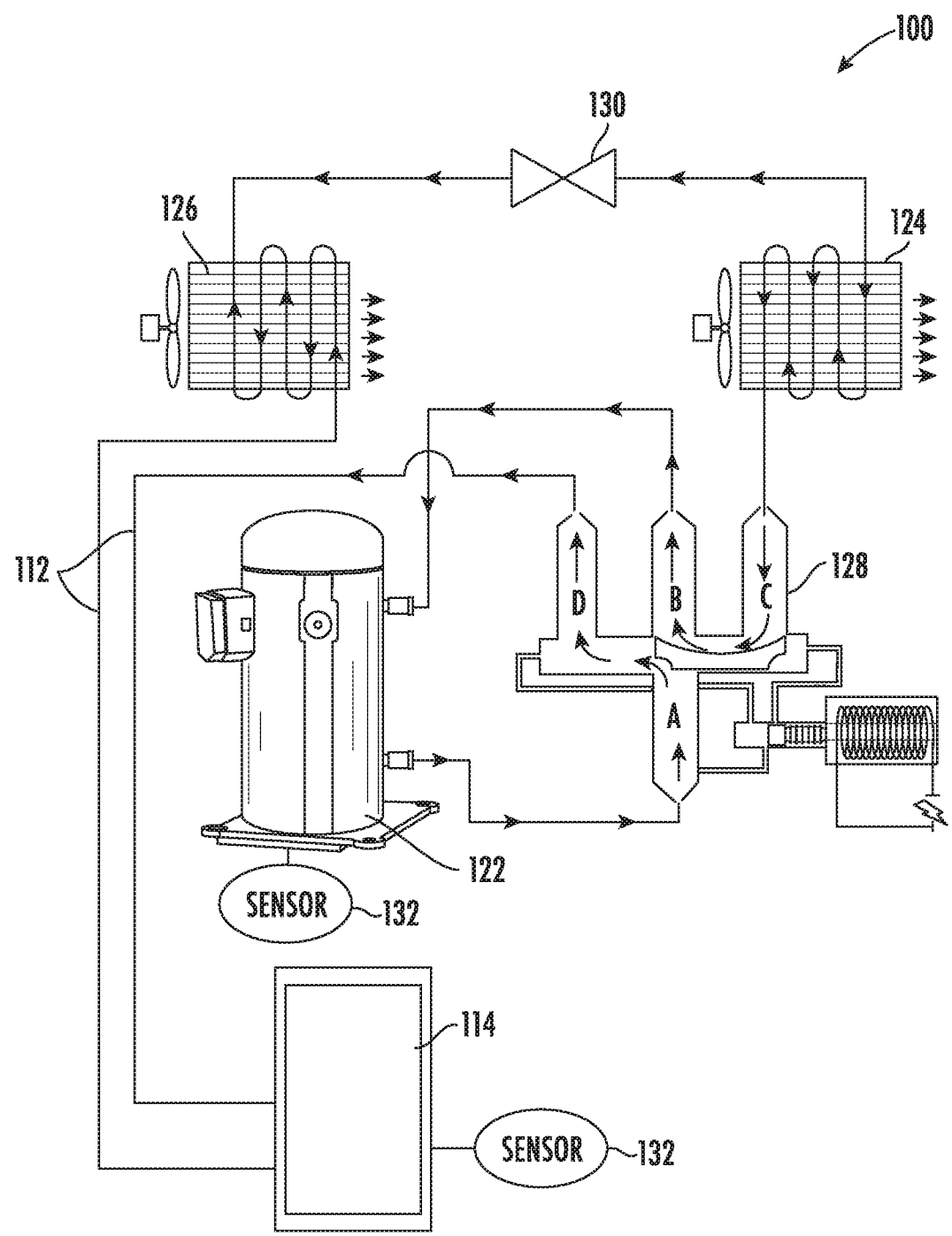
FIG. 4 illustrates another detailed view of an example heat recovery system in a cooling cycle, according to another embodiment of the present invention.

FIGS. 3-4 illustrate detailed fluid communication between a compressor 122, a solar thermal collection module 114, a first heat exchanger 124 and a second heat exchanger 126, and a reversing valve 128 via a fluid circuit 112.

Referring to FIG. 3, in the heating mode of a refrigeration cycle, refrigerant flows through the solar thermal collection module 114 after returning from an evaporator coil of the first heat exchanger 124. When refrigerant flows through the solar thermal collection module 114, refrigerant temperature and pressure increase. The pressurized vapor condenses at high pressure and temperature inside a condensing coil of the second heat exchanger 126. During the condensation of refrigerant, the heat released is used to heat the air supplied to a HVAC system. Condensed refrigerant is then transported to the evaporation coil of the first heat exchanger 122, which lowers the pressure. The refrigerant then goes on to another circle. Refrigerant flow in the fluid circuit 112 between each of the components of the system is illustrated by arrows in FIG. 2.

Compressor 122 is configured to compress gas into a hot, high-pressure liquid and the high pressure liquid flows out of the bottom of the compressor 122 to the reversing valve 128. The refrigerant enters the reversing valve 128 through port A and is diverted into port C and flow to the evaporating coil of the first heat exchanger 124. A fan blows across the evaporating coil, releasing heat energy to an indoor area. Then the refrigerant flows out of evaporating coil to expansion valve 130. The pressure of the refrigerant gas dramatically decreases on the opposite side of expansion valve 130 and the refrigerant cools downs to a cold vapor. The refrigerant flows from the expansion valve 130 to the condensing coil of the second heat exchanger 126 and a fan blows across the condensing coil and release cold air to an outdoor environment. The refrigerant flows out of condensing coil to solar thermal collection module 114 while the cold refrigerant absorbs the solar thermal heat, increasing in temperature and pressure. The refrigerant flows out of solar thermal module 114 back to reversing valve 128 and flows into port D of reversing valve 128. The refrigerant then flows from port D into port B of the reversing valve 128 and flows from port B back to the compressor 122 to be recompressed into a high-pressure, warm liquid to repeat the cycle again.

The compressor 122 compress the refrigerant into a high-pressure liquid by supplementing solar thermal energy into the fluid circuit 112 and then directly delivery into a building. Even in the depth of winter, special properties of the solar thermal collection module 114 allow the temperature to rise to well over 400° F., which can still save a large of portion of electrical energy for the compressor 122.

Referring to FIG. 4, similar to the heating cycles depicted in FIG. 3, the compressor 122 utilizes solar thermal heat to control the pressure and flow of refrigerant in a cooling cycle. The same benefits apply in the cooling cycle as mentioned in the heating cycle. In this scenario, the first heat exchanger 124 includes a condensing coil and the second heat exchanger 126 includes an evaporation coil. The compressor 122 pumps the refrigerant through the condensing coil of the first heat exchanger 124 and releases heat absorbed from an indoor environment. Fluid (i.e. refrigerant) in the fluid circuit 112 is then passed through an evaporation coil of the secondary heat exchanger 126 in which heat from a building is passed over to the refrigerant and raised its pressure on a high-pressure side of the system 100. The refrigerant exiting the evaporation coil in the second heat exchanger 126 is then passed through the compressor 122 in which further increases the refrigerant pressure before entering the first heat exchanger 124 for another fluid moving cycle.

The compressor 122 is configured to compress cold gas into a hot high-pressure liquid, and the hot high-pressure liquid flows out of the bottom of the compressor 122 to the reversing valve 128. The refrigerant enters the reversing valve 128 through port A and is diverted into port D. The refrigerant flows from port D to the solar thermal collection module 114. The pressure of the refrigerant dramatically increases as it passes through the solar thermal collection module 114. The increase in pressure of the refrigerant is detected by the light intensity sensors 132 within solar thermal collection module 114 and/or the compressor 122. The compressor 122 is configured to decrease its speed and torque against the refrigerant, lowering the consumption of electrical energy. The refrigerant flows out of the solar thermal collection module to the condensing coil. The warm refrigerant flows through condensing coil of the second heat exchanger 126. Fan blows air across the condensing coil, removing the excess heat to the outdoors and transferring the thermal energy from indoors to outdoors. The refrigerant flows from the condensing coil to the expansion valve 130, and the refrigerant is released on the other side of expansion valve 130, dropping the pressure of the refrigerant and therefore the temperature of the refrigerant. The refrigerant changes state from a hot, high-pressure liquid to a cold, low-pressure gas. The refrigerant flows from expansion valve 130 to the evaporating coil of the first heat exchanger 122. A fan blows across the evaporating coil, blowing the cooler air indoors. The refrigerant flows out of the evaporating coil back to reversing valve 128 and through port C into port B of reversing valve 128. The refrigerant flows out of port B back to compressor 122 to be recompressed into a high-pressure warm liquid to repeat the cycle again.

Similar to the heating cycle, the system 100 enables the solar thermal energy to increase the pressure within the refrigeration cycle, which in turn decreases the electrical consumption of the compressor 122 to achieve efficient heat transfer. As such, the sunnier and hotter it is outside, the more air conditioning will be required and the more solar thermal energy can be provided. Under these circumstances, the sunlight and heat in the environment can act as another source energy in addition of electrical energy to keep the compressor 122 working.

Referring to FIGS. 3-4, at least one light intensity sensor 132 is configured to determine the light intensity of the environment. The light intensity sensor 132 can be positioned inside the solar thermal collection module 114 and/or the compressor 122. The light intensity sensor 132 can be at least one of pressure and/or temperature sensor configured to measure pressure and/or temperature of fluid inside the solar thermal module 114. The rise in pressure and/or temperature enabled by the solar thermal collection module 114 will reflect transfer of solar thermal energy. The more solar and thermal energy detected, the less the electricity used by the compressor 122.

Figure 5:
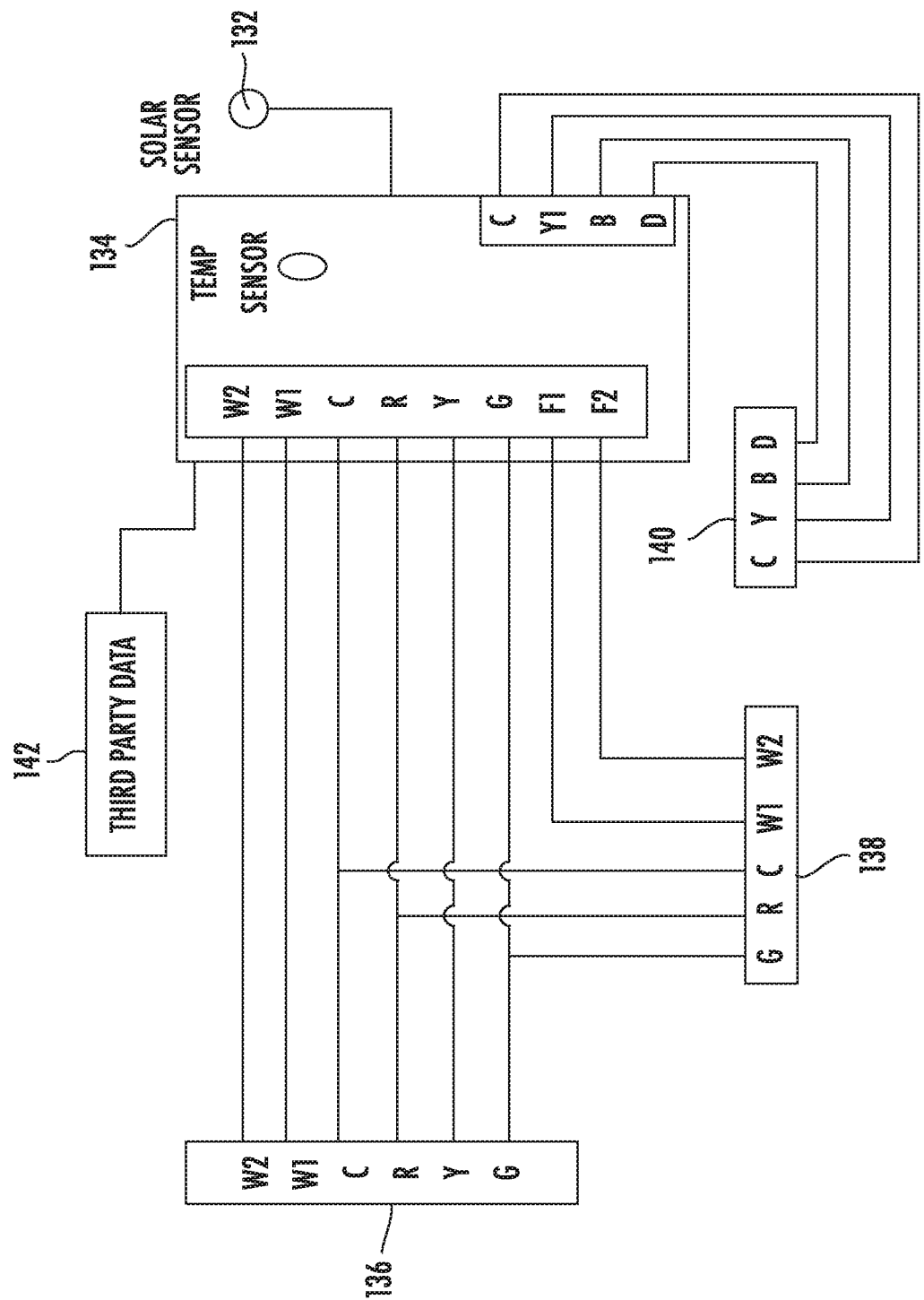
FIG. 5 is a central heat recovery unit incorporating a solar intensity sensor, according to another embodiment of the present invention.

Referring to FIG. 5, the system 100 further includes a central heat recovery unit 134 configured to receive data input from the light intensity sensor 132 and other components of the system. The central heat recovery unit 134 is also connected to one or more controllers operably linked to respective operating components of the heat recovery system 100. For example, the central heat recovery unit 134 is connected to a furnace control board 136, a thermostat board 138, a heat pump controller board 140 and other functional components (e.g., fan, motors, etc.). Based on data inputs from the light intensity sensor 132, the central intelligence unit 134 enables the system 100 to achieve highest efficiency by using solar thermal energy obtained via the solar thermal module 114 to replace a portion of electrical energy otherwise needed to increase fluid pressure of the compressor 122 of the system 100.

According to another embodiment of the present invention, the central heat recovery unit 134 is configured to receive weather data from a third party 142 and enable the operation of compressor to work from a heating mode to a cooling mode (defrost cycle) when weather data indicate a certain threshold (e.g., temperature below freezing point) and/or certain conditions (e.g., snow, precipitation, etc.).

Buildup of ice and snow in the winter months dramatically reduce or completely nullify performance of the solar thermal collection module 114. Converting from a heating mode to a cooling mode will enable the defrosting of ice or snow built up on the solar thermal collection module in a defrost cycle. Specifically, the central intelligence unit 134 will enable the evaporating coil of the second heat exchanger 126 inside the heat pump 110 to blow hot air onto the backside of the solar thermal collection module 114, melting any ice or snow built up thereon and allowing the system to maintain maximum performance even in the depth of winter. The defrost cycle is a mechanical action in which the compressor 122 is configured to reverse back to a cooling mode from a heating mode and pull hot refrigerant through the outdoor section to defrost ice built up on the solar thermal collection module 114. In this scenario, the hot air removed from the interior is drafted onto the solar thermal collection module 114 instead of being releasing into the environment. Even if there is no ice or snow built up, hot air is directed to the solar collection module 114 and transferred right back into the fluid circuit instead of blowing the thermal energy into the outdoor environment and wasting valuable heat.

Figure 6:
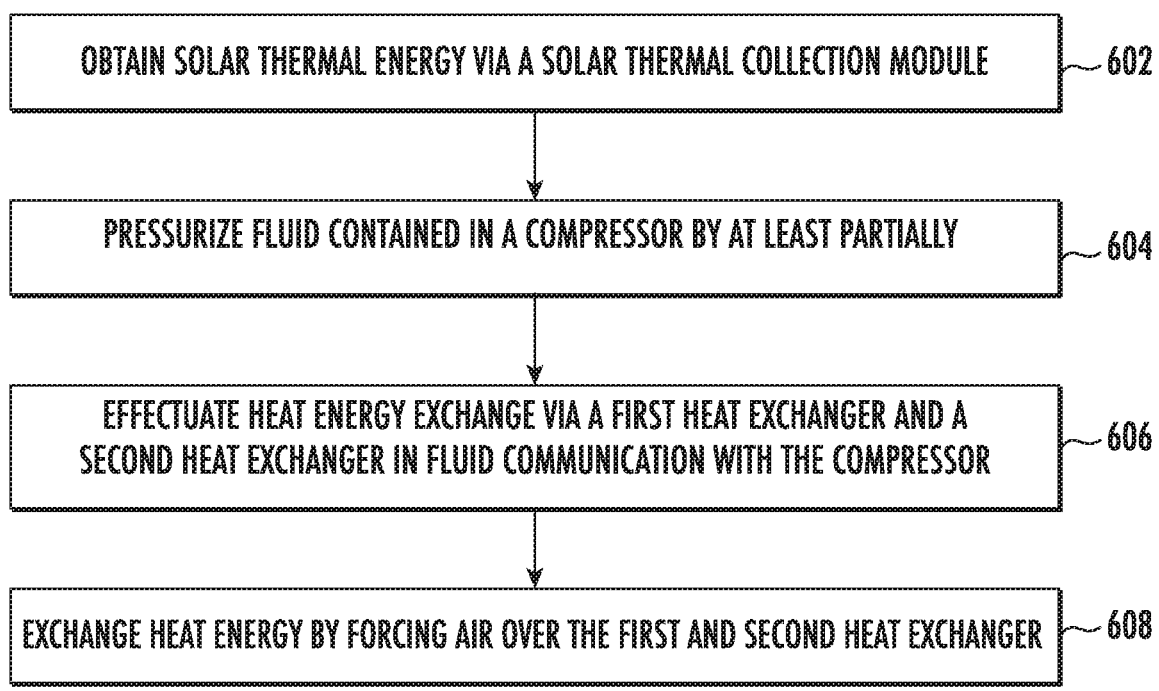
FIG. 6 is a flow chart illustrating a method of heat exchange, according to another embodiment of the present invention.
Figure 7:
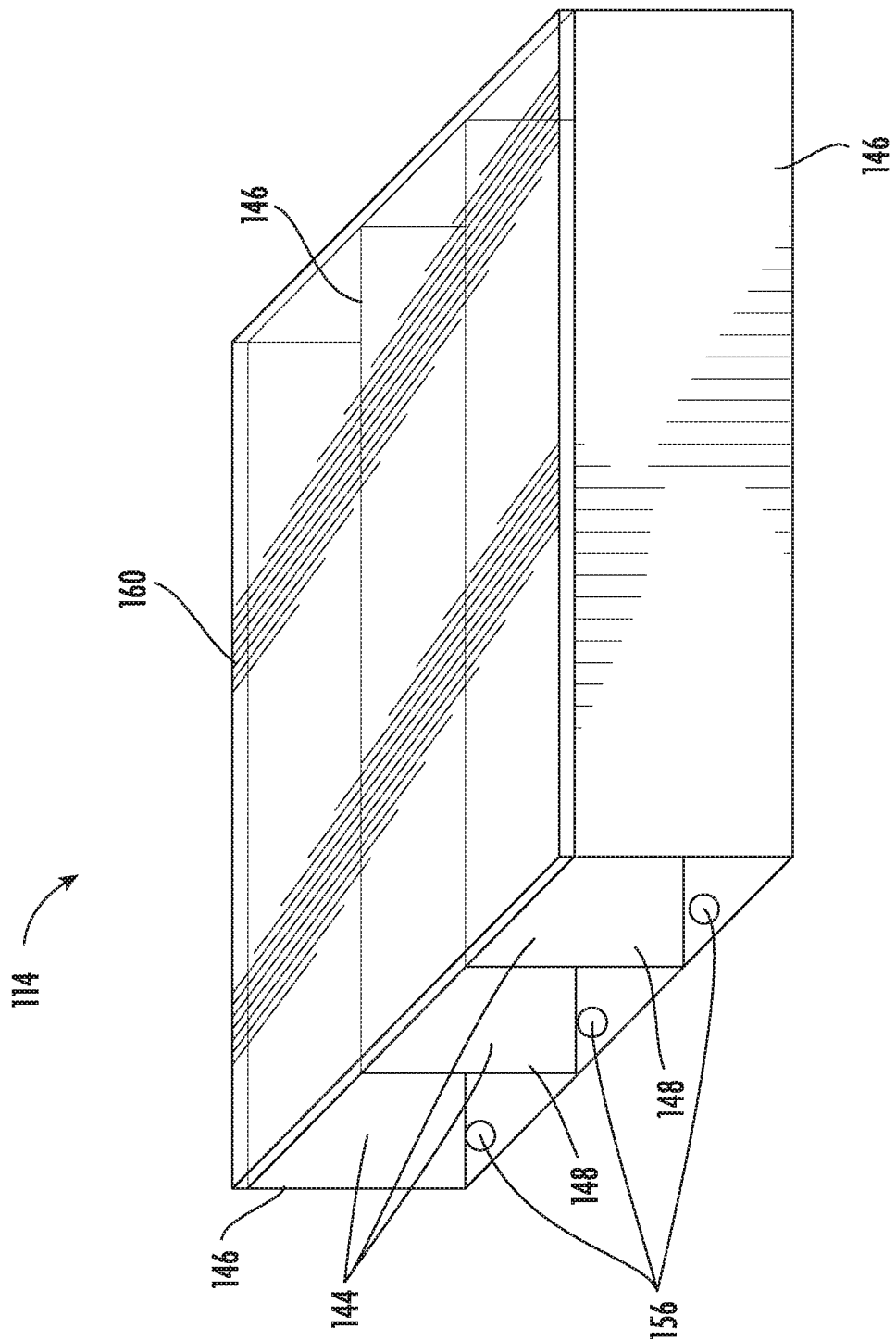
FIG. 7 is a perspective view of an example solar thermal collection module, according to another embodiment of the present invention.

Referring to FIG. 6, a method of recovering heat and energy includes, at step 602, obtaining solar thermal energy via a solar thermal collection module (e.g., solar thermal collection module 114). The solar thermal collection module 114 is configured to utilize solar thermal energy to increase fluid pressure inside the heat pump 110. The solar thermal energy can increase fluid temperature within a compressor (e.g., compressor 122) in fluid communication with the solar thermal collection module 114. By capturing solar thermal energy, a large part of fluid (e.g., refrigerant) pressurization can be achieved with little mechanical work, limiting the amount of electrical energy required.

At step 604, fluid contained in a compressor is pressurized by at least partially utilizing the obtained solar thermal energy. Specifically, a light intensity sensor (e.g., light intensity sensor 132) can measure pressure and/or temperature of fluid inside the solar thermal module 114 and/or the compressor. The rise in pressure and/or temperature enabled by the solar thermal collection module 114 reflects presence of the solar thermal energy. The more thermal and solar energy is detected to be present, the less the electricity will be used by the compressor 122 to pressurize the fluid in the compressor 122. The amount of electricity needed to run the compressor 122 can be determined by a central intelligence unit (e.g., central intelligence unit 134).

At step 606, heat energy exchange is effectuated via a first heat exchanger and a second heat exchanger in fluid communication with the compressor. The central thermal recovery unit 134 is configured for determining an operating instruction based on the at least one environmental measurement (e.g., outdoor temperature) and system-related data received from the one or more components of the system (e.g., thermostat). For example, the system will start a heating mode or a cooling mode depending on the temperature of outdoor environment and the temperature set by a thermostat. The central thermal recovery unit 134 is further configured to determine a specific operation sequence of a series of operating components. For example, the central thermal recovery unit 134 is configured to ensure the compressor (e.g., compressor 122) runs for a certain time period (e.g., 5 minutes, 10 minutes, etc.) based on the amount of solar thermal energy obtained via the solar thermal module 114. As another example, when the central thermal recovery unit 134 detects the compressor and the solar thermal energy is not adequate to fulfill a heating need, a furnace (e.g., furnace 116) is activated to input supplemental heat to the system.

In a heating mode, the pressurized vapor is condensed at high pressure and temperature inside a condensing coil of the second heat exchanger 124. As the refrigerant condenses, heat is released, providing heated air to a heat recovery system. The liquid refrigerant is then transported to the evaporation coil of the first heat exchanger 124, which lowers the pressure and goes on to another circle.

In a cooling cycle, a first heat exchanger (e.g., first heat exchanger 124) includes a condensing coil and a second heat exchanger (e.g., second heat exchanger 126) includes an evaporation coil. In this scenario, the compressor 122 pumps the refrigerant through the condensing coil of the first heat exchanger and releases heat absorbed from an indoor environment. Fluid (i.e. refrigerant) in the fluid circuit 112 is then passed through an evaporation coil of a second heat exchanger in which heat from a building is passed over to the refrigerant and raised its pressure on a high-pressure side of the system 100.

At step 608, heat energy is exchanged by forcing air over the first and second heat exchanger. Air was forced through the condensing coil and evaporating coil to achieve the heat exchange during a heating mode and cooling mode.

Figure 8:
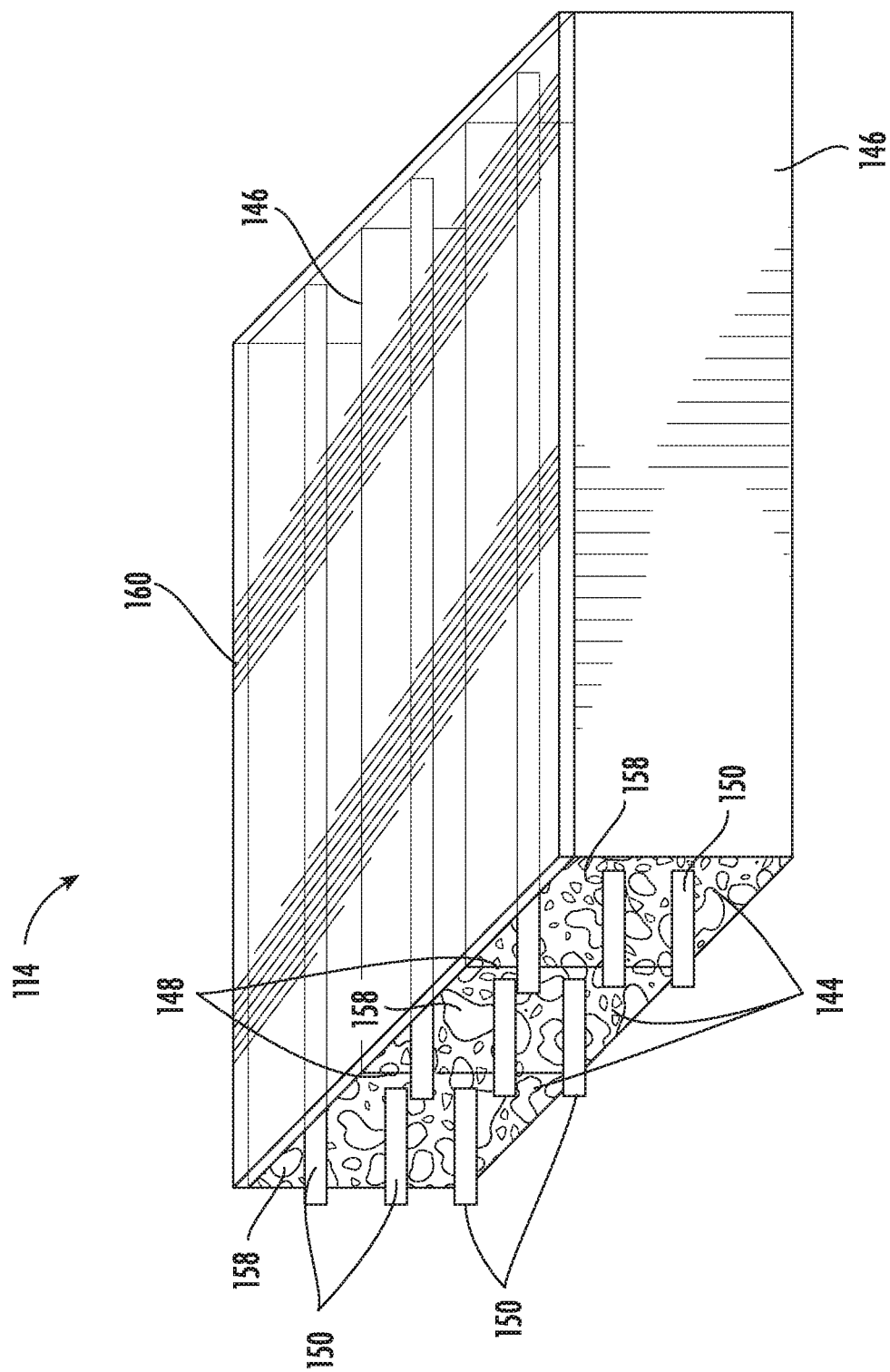
FIG. 8 is another perspective view of the solar collection module of FIG. 7.
Figure 9:
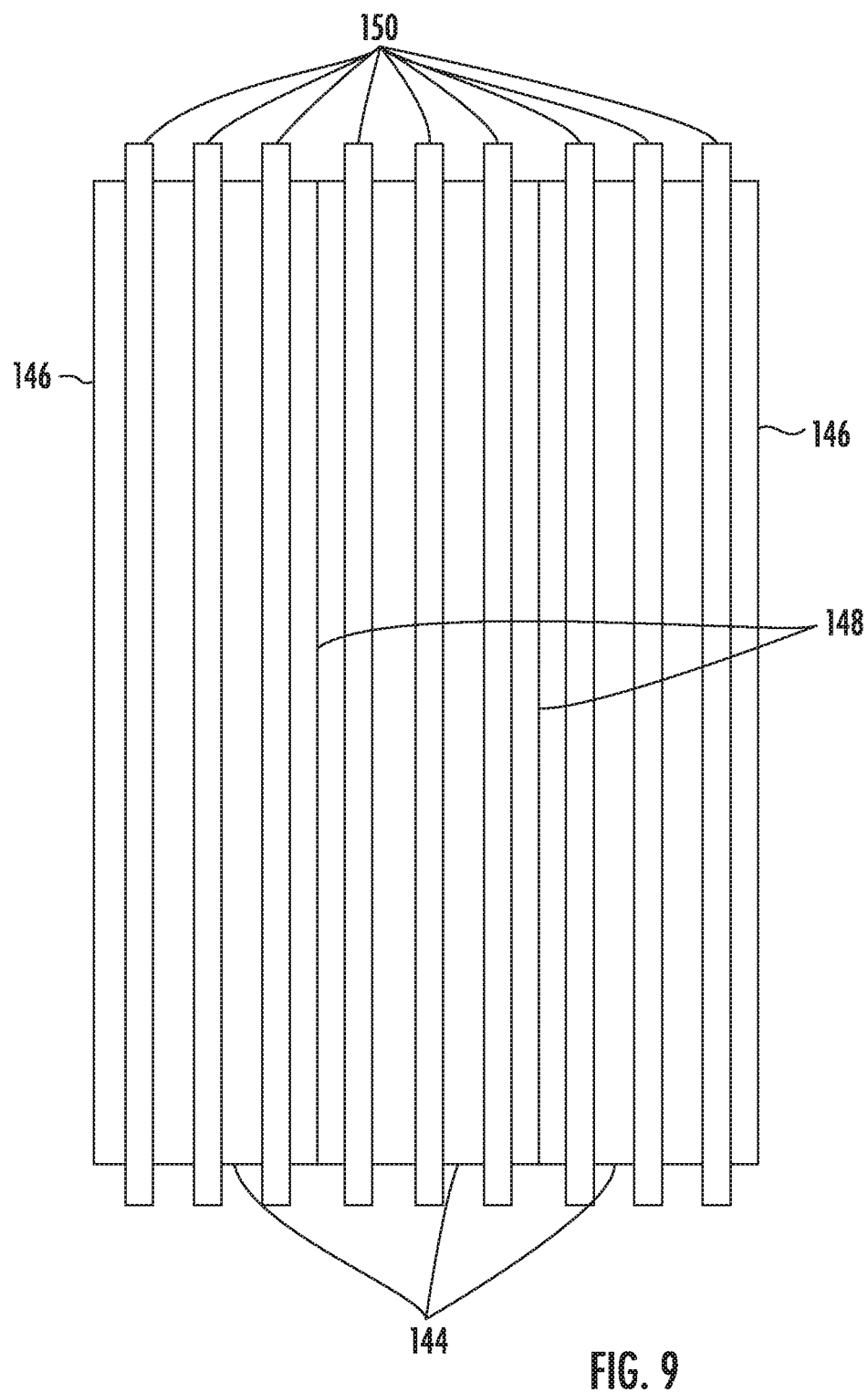
FIG. 9 is a front view of the solar collection module of FIG. 7.
Figure 10:
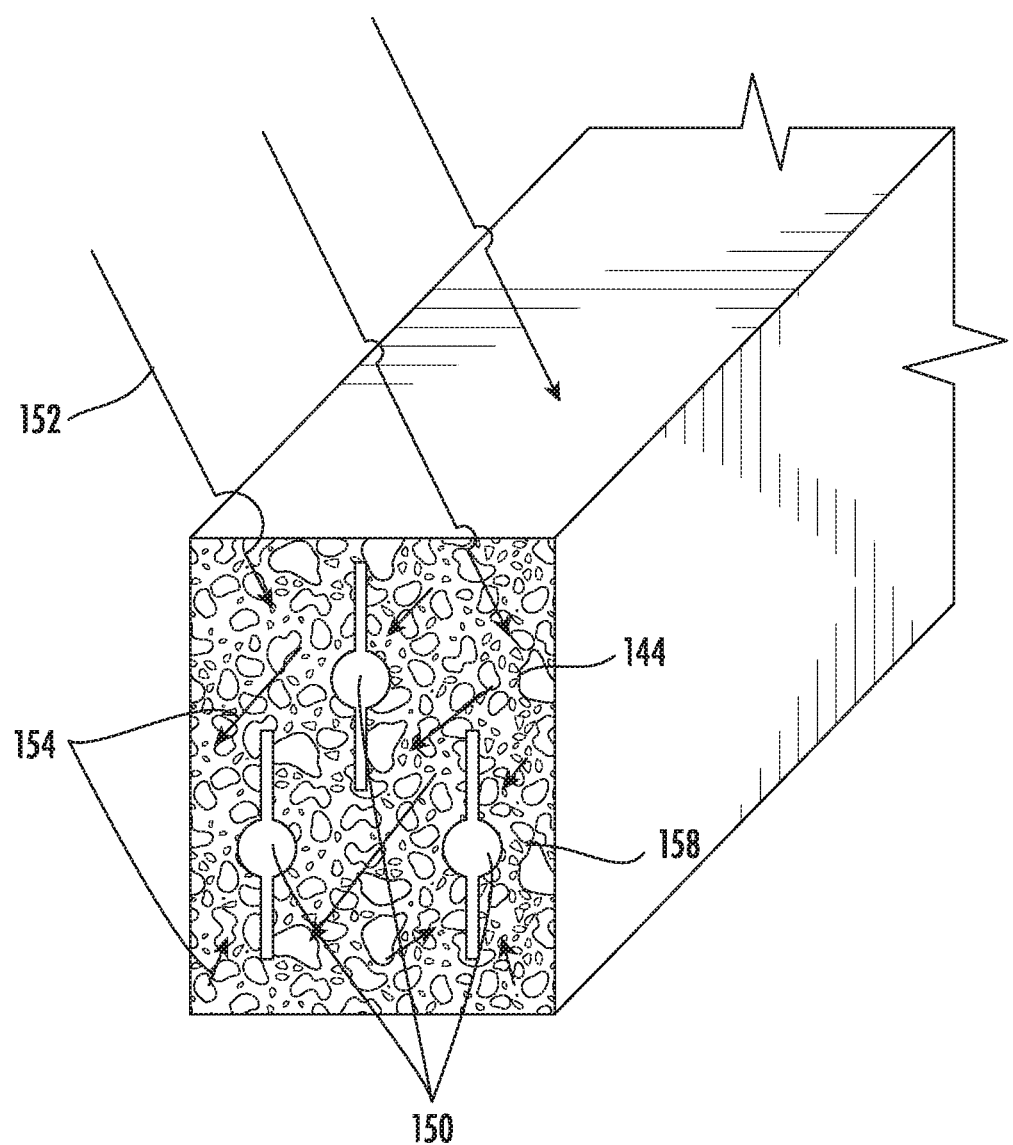
FIG. 10 is a detailed view of a solar collection cell.

Referring to FIGS. 7-10, a solar thermal collection module 114 includes a plurality of (e.g., three) cell chambers 144 positioned in parallel and formed by four exterior surfaces 146 (top surface, bottom surface, and two vertical surfaces) and a plurality of (e.g., two) vertical division panels 148. The exterior surfaces 146 and the division panels are preferably made of materials having good insulating properties and a dark, radiation-absorbing coloring for obtaining the solar radiation. In the depicted embodiment, each chamber 140 is depicted as an elongated chamber having a rectangle cross section. Other suitable shapes can also be used. The interior walls of each chamber 144 are covered with a reflective material such as silver and other materials. The reflective material allows reflective properties up to one hundred times stronger than conventional reflective wraps. A plurality of interconnected fluid pipes 150 are positioned inside each chamber 144. As a specific example, a plurality of interconnected fluid pipes 150 run through each chamber 144, positioned approximately two inches apart and staggered at different heights so that no single pipe shadows another, as shown in FIGS. 8-10. The plurality of interconnected fluid pipes 150 are covered with thermal absorbing coating material. Additionally, a layer of thermal coating can also be deposited onto the thermal absorbing coating material and/or the one or more fluid pipes 150. This configuration allows direct and indirect sunlight to focus onto the one or more fluid pipes 150, regardless of the angle of the sun for optimal solar and thermal heat transfer. Each solar thermal chamber 144 is insulated with foam or other high insulation factor materials 158 which will keep the heat within each chamber 144 long after the source of the thermal energy (e.g., direct sunlight 152 and indirect sunlight 154 or thermal energy) are no longer present. The solar collection module 114 is also covered by tempered glass 160 for maximum solar transfer and safety. Such design of the solar collection module 114 can trap heat within each cell chamber 144 and increase the pressure of the fluid after the source of the thermal energy gain is gone. One or more drain holes 156 are located on a bottom surface of each cell chamber 144 for draining condensing liquid and moisture buildup.

Figure 11:
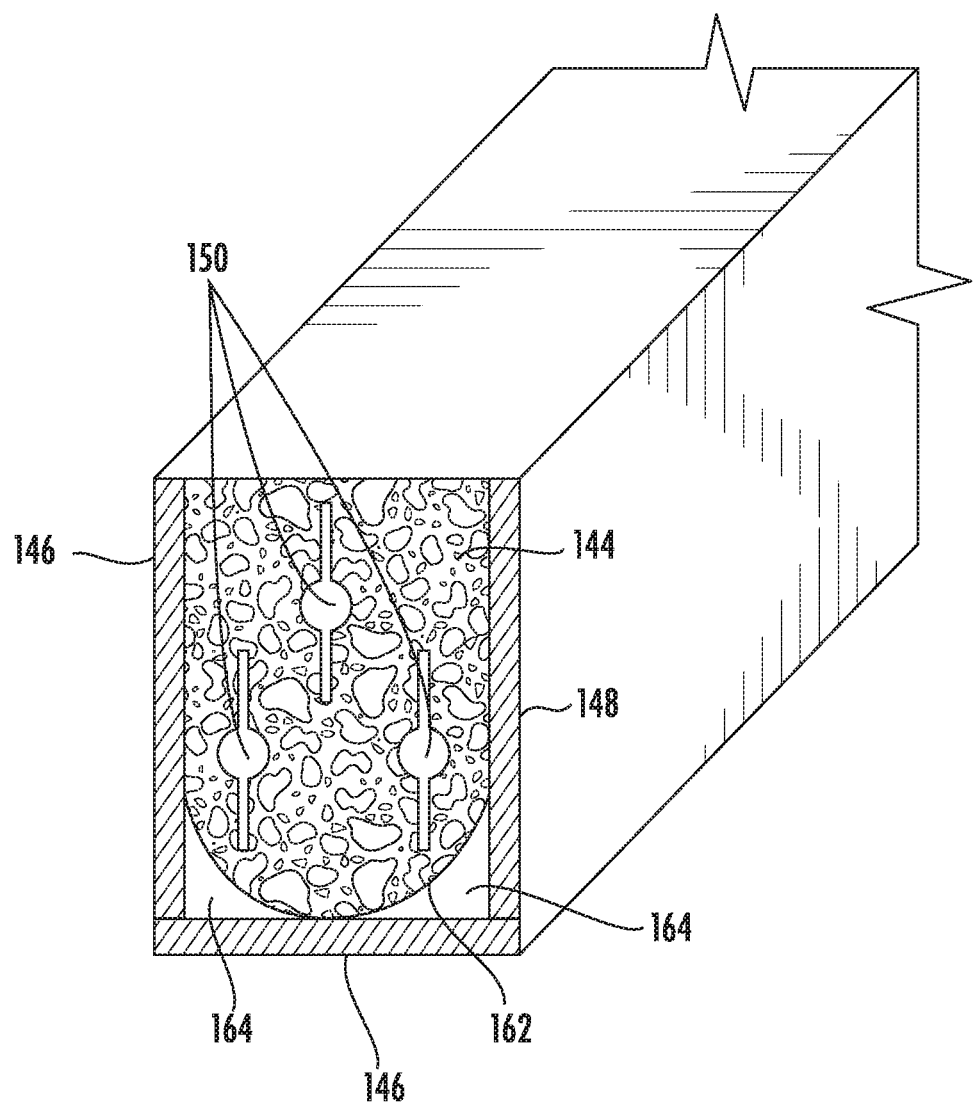
FIG. 11 is a cross sectional view of another embodiment of FIG. 10 of the present invention of a metal layer.

Referring to FIG. 11, according to another embodiment of the present invention, a metal layer (e.g., a layer of galvanized steel) 162 is positioned inside each of the respective chambers and in close proximity to a bottom surface 146 of each chamber 144. A respective air gap 164 is formed between the bottom surface 146 and the metal layer 162 as further insulation. The chamber 144 can be further covered by an outer metal layer (e.g., steel layer), which can facilitate heat absorbing into the plurality of chambers 144.

The present invention allows heat pump to be used at extremely high efficiencies. This can reduce the need to use fossil fuels and electricity in the same HVAC system, in return, this can reduce greenhouse gas production and achieve the same comfort level within the building. This method will save significant amounts of electricity.

The present invention has advantages over traditional HVAC systems in that it produces less greenhouse gases and makes effective use of heat energy that is typically released into the environment. The present invention enables a dramatic reduction in electrical consumption by the compressors in the refrigeration circuit, which in turn transfer the thermal energy from the flue gas and solar energy mixture back into the HVAC airstream to the benefit of building heating efficiency.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A heat recovery system comprising:
a variable speed inverter compressor in fluid connection with a first heat exchanger and a second heat exchanger via a fluid circuit;
a solar thermal collection module positioned on top of the compressor and in fluid communication in the compressor, the first heat exchanger and the second heat exchanger;
a light intensity sensor configured to determine light intensity on the solar thermal collection module; and
a central heat recovery unit configured to receive input of the light intensity sensor and determine operation of the compressor based on the input from the light intensity sensor;
wherein the solar thermal collection module is configured to retain solar thermal energy to increase fluid pressure in the compressor; and
wherein the operation of the compressor is based on measurement of the light intensity sensor.

2. The heat recovery system of claim 1, wherein the solar thermal collection module includes:
a plurality of solar thermal cell chambers positioned in parallel and covered by tempered glass; and
a plurality of interconnected fluid pipes positioned through the plurality of solar thermal cell chambers;
wherein each of the plurality of fluid pipes are covered by thermal absorbing coating material;
wherein a layer of reflective material is covered on inner sidewall of each solar thermal cell chamber;
wherein each cell chamber is filled with foam material to retain heat obtained from solar thermal energy; and
wherein one or more drain holes are located on a bottom surface of each cell chamber for draining condensing liquid and moisture buildup.

3. The heat recovery system of claim 1, wherein the light intensity sensor is a pressure sensor configured to determine pressure of the fluid inside at least one of the solar thermal collection modules and the compressor.

4. The heat recovery system of claim 1, wherein the light intensity sensor is a temperature sensor configured to determine temperature of the fluid inside at least one of the solar thermal collection modules and the compressor.

5. The heat recovery system of claim 1, further comprising a reversing valve configured to switch a direction of the fluid movement between the compressor, the solar thermal collection module, the first heat exchanger and the second heat exchanger based on a cooling demand or a heating demand.

6. The heat recovery system of claim 1, wherein the central heat recovery unit is configured to achieve a highest efficiency of the system.

7. The heat recovery system of claim 1, wherein the central heat recovery unit is configured to determine the running time period for the compressor based on the input from the light intensity sensor.

8. The heat recovery system of claim 1, wherein the central heat recovery unit is further configured to receive weather data from a third party.

9. The heat recovery system of claim 8, wherein the central heat recovery unit is configured to activate a cooling cycle to heat the solar thermal collection module when weather indicates a certain condition.

10. The heat recovery system of claim 9, wherein the certain condition to activate a cooling cycle includes at least one of snow, precipitation and temperature below 32 degrees Fahrenheit.

11. A method of recovering heat and energy comprising:
obtaining solar thermal energy via a solar thermal collection module;
pressurizing fluid contained in a compressor by at least partially utilizing absorbed solar thermal energy;
effectuating heat energy exchange via a first heat exchanger and a second heat exchanger in fluid communication with the compressor; and
exchanging heat energy by forcing air over the first and second heat exchanger;
wherein the solar thermal collection module is positioned on top of the compressor, forming an integral piece; and
wherein pressurizing fluid contained in the compressor by at least partially utilizing thermal energy from the absorbed solar energy includes determining solar intensity on the solar thermal collection module and determining an amount of mechanical compression need to achieve a certain fluid pressure.

12. The method of claim 11, wherein the solar thermal collection module includes:
a plurality of solar thermal cell chambers positioned in parallel and covered by tempered glass; and
a plurality of interconnected fluid pipes positioned through the plurality of solar thermal cell chambers;
wherein each of the plurality of fluid pipes are covered by thermal absorbing coating material;
wherein a layer of reflective material is covered on inner sidewall of each solar thermal cell chamber;
wherein each cell chamber is filled with foam material to retain heat obtained from solar thermal energy; and
wherein one or more drain holes are located on a bottom surface of each cell chamber for draining condensing liquid and moisture buildup.

13. A solar thermal collection module comprising:
a plurality of solar thermal cell chambers positioned in parallel and covered by tempered glass;
a plurality of interconnected fluid pipes positioned through the plurality of solar thermal cell chambers; and
a light intensity sensor positioned inside the solar thermal collection module;
wherein each of the plurality of fluid pipes are covered by thermal absorbing coating material;
wherein reflective film is covered on inner sidewall of each solar thermal cell chamber;
wherein each cell chamber is filled with foam material to retain heat obtained from solar thermal energy; and
wherein one or more drain holes are located on a bottom surface of each cell chamber for draining condensing liquid and moisture buildup.

14. The solar thermal collection module of claim 13, wherein a metal layer is positioned inside each of the plurality of solar thermal cell chambers and in close proximity to respective bottom surface of each chamber such that an air gap is formed between the respective bottom surface and the metal layer.

15. The solar thermal collection module of claim 13, wherein the solar light intensity sensor is a temperature sensor.

16. The solar thermal collection module of claim 13, wherein the solar light intensity sensor is a pressure sensor configured to measure pressure of fluid contained in the one or more of the plurality of fluid pipes.

17. The solar thermal collection module of claim 13, wherein the plurality of interconnected fluid pipes are positioned approximately at certain distance apart and staggered at different height in a manner in which no single pipe shadows another in each chamber.

18. A heat recovery system comprising:
a variable speed inverter compressor in fluid connection with a first heat exchanger and a second heat exchanger via a fluid circuit;
a solar thermal collection module positioned on top of the compressor and in fluid communication in the compressor, the first heat exchanger and the second heat exchanger;
a light intensity sensor configured to determine light intensity on the solar thermal collection module; and
a reversing valve configured to switch a direction of the fluid movement between the compressor, the solar thermal collection module, the first heat exchanger and the second heat exchanger based on a cooling demand or a heating demand;
wherein the solar thermal collection module is configured to retain solar thermal energy to increase fluid pressure in the compressor; and
wherein the operation of the compressor is based on measurement of the light intensity sensor.

19. A method of recovering heat and energy comprising:
obtaining solar thermal energy via a solar thermal collection module;
pressurizing fluid contained in a compressor by at least partially utilizing absorbed solar thermal energy;
effectuating heat energy exchange via a first heat exchanger and a second heat exchanger in fluid communication with the compressor; and
exchanging heat energy by forcing air over the first and second heat exchanger;
wherein the solar thermal collection module is positioned on top of the compressor, forming an integral piece; and
wherein the solar thermal collection module includes:
a plurality of solar thermal cell chambers positioned in parallel and covered by tempered glass; and
a plurality of interconnected fluid pipes positioned through the plurality of solar thermal cell chambers;
wherein each of the plurality of fluid pipes are covered by thermal absorbing coating material;
wherein a layer of reflective material is covered on inner sidewall of each solar thermal cell chamber;
wherein each cell chamber is filled with foam material to retain heat obtained from solar thermal energy; and wherein one or more drain holes are located on a bottom surface of each cell chamber for draining condensing liquid and moisture buildup.

20. A solar thermal collection module comprising:
a plurality of solar thermal cell chambers positioned in parallel and covered by tempered glass; and
a plurality of interconnected fluid pipes positioned through the plurality of solar thermal cell chambers;
wherein each of the plurality of fluid pipes are covered by thermal absorbing coating material;
wherein reflective film is covered on inner sidewall of each solar thermal cell chamber;
wherein each cell chamber is filled with foam material to retain heat obtained from solar thermal energy;
wherein one or more drain holes are located on a bottom surface of each cell chamber for draining condensing liquid and moisture buildup; and
wherein a metal layer is positioned inside each of the plurality of solar thermal cell chambers and in close proximity to respective bottom surface of each chamber such that an air gap is formed between the respective bottom surface and the metal layer.

21. A solar thermal collection module comprising:
a plurality of solar thermal cell chambers positioned in parallel and covered by tempered glass; and
a plurality of interconnected fluid pipes positioned through the plurality of solar thermal cell chambers;
wherein each of the plurality of fluid pipes are covered by thermal absorbing coating material;
wherein reflective film is covered on inner sidewall of each solar thermal cell chamber;
wherein each cell chamber is filled with foam material to retain heat obtained from solar thermal energy;
wherein one or more drain holes are located on a bottom surface of each cell chamber for draining condensing liquid and moisture buildup; and
wherein the plurality of interconnected fluid pipes are positioned approximately at certain distance apart and staggered at different height in a manner in which no single pipe shadows another in each chamber.

* * * * *